Sept. 1, 1964     D. E. VARNER     3,146,910

CONTROL SYSTEM

Filed Nov. 7, 1960     3 Sheets-Sheet 1

Inventor

Donald E. Varner by Anthony D. Cennamo

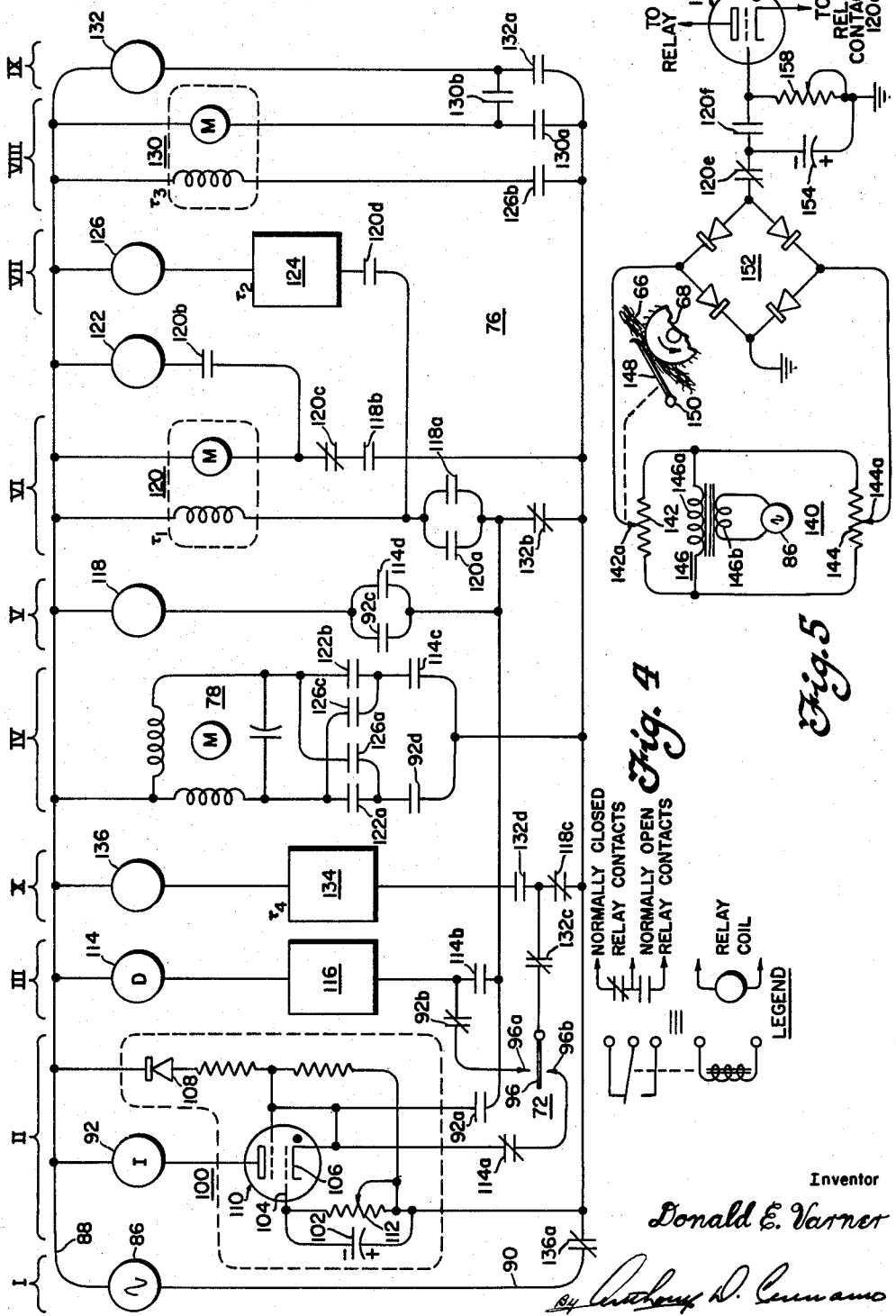

United States Patent Office 3,146,910
Patented Sept. 1, 1964

3,146,910
CONTROL SYSTEM
Donald E. Varner, Columbus, Ohio, assignor to Industrial Nucleonics Corporation, a corporation of Ohio
Filed Nov. 7, 1960, Ser. No. 67,576
8 Claims. (Cl. 222—55)

This invention relates generally to automatic control systems for continuous industrial processes, and more particularly it relates to a method and means for controlling a process having a virtual or actual material reservoir located between the input and output thereof.

Control systems have been provided in the past which measure a manufactured product and control the average rate of flow of material from which the product is formed, thereby providing excellent average control when the system is operating under ideal conditions. Systems of this type suffer from the disadvantage, however, that short term variations in the product cannot be compensated since the control signal is applied at the source of the material. Hence the control loop encompasses all of the time lags in the system, including the time delays in transmitting signals through the loop, the time lag involved in the response of the ultimate controller device to the control signal, and the process transportation lag between the point at which the process is controlled and the point at which the measurement is obtained. It is well known in control systems of this type that the limiting frequency of fluctuations which can be controlled is determined by the total time lag in the control loop.

In order to minimize high frequency or short term variations and thereby provide a more uniform product, many processes employ a recirculating "reservoir loop" between the material input and the product output. While the mass flow of the material input on the average is maintained nominally equal to the mass flow of the product output, the mass flow in at least one portion of the reservoir loop is larger than either. The excess flow in this portion is then accurately trimmed to produce a very uniform product output flow, in that most of the short term variations are leveled off and removed in the "trimmings" constituting the surplus material, which is returned to merge with the material input flow. Thus the reservoir loop absorbs short term excesses in the input flow and supplies the extra material required when short term deficiencies occur in the input flow. Moreover, the trimming device is located near the sector where the measurable final product is formed, and automatic control of the trimming device is effected by a controller which can be made very fast acting in view of the reduction in the transportation lag.

In this system, optimum performance prevails when the average material input flow is exactly equal to the product output flow, and when at the same time the mass flow in the aforesaid portion of the reservoir loop exceeds the output flow by a predetermined amount which allows the trimming device and the controller thereof to operate in its most effective, linear range. To this end, prior multiple loop control systems have included an auxiliary control device designed to maintain these optimum conditions by sensing the quantity or mass flow of material in the reservoir loop, increasing the rate of feed of material to the input when the mass flow in the reservoir loop is low, and decreasing the rate of feed when the reservoir mass flow is high.

These prior art devices are implicity based on the theory that any depletion of the material in the reservoir loop is exclusively the result of a deficiency in the average rate of feed at the input, and, conversely, that an excess amount of material in the reservoir loop is exclusively the result of an excessive average feed rate at the input. In accordance with this invention, it has now been found that this is by no means always the case, as will appear from the following considerations. Suppose that, as frequently happens in practice, the process is running under conditions wherein the product output mass flow is exactly equal to the material input mass flow. However, due to some precedent, accidental cause, such as a temporary shortage in the raw material supply, the reservoir loop has been substantially depleted of material. Until some corrective action is taken, the material flow arriving at the sector of the trimming device must be straightway delivered to the output with little or no trimming or leveling by said device, resulting in excess variance in the product output. Obviously, corrective action must be taken, and yet it is illogical to disturb the perfect balance of the input and output flows by simply increasing the feed rate in the manner of the prior art devices. To do so will gradually build up the supply of material in the reservoir loop to the proper level, but unfortunately the fact that the input flow is thereby made greater than the output flow will result in the accumulation of an oversupply of material in the reservoir loop. Hence to prevent choking of the machine the control device must then decrease the feed rate, and so on. This results in an undesirable, oscillatory performance of the process and the control system therefor which is apt to be self-sustaining.

Returning to the assumed situation wherein the input and output mass flows are in perfect balance but the reservoir is depleted, the logical corrective action is not to disturb the existing feed rate but to simply add enough material directly into the reservoir loop to replenish the same. This procedure, however, would require some auxiliary means not only for automatically adding the extra material to the reservoir loop, but for removing material therefrom when an oversupply is present. Such an auxiliary device is generally unfeasible for technical and/or economic reasons, as is rather apparent from the nature of the exemplary processes described hereinafter.

Therefore, in accordance with this invention I provide what is termed a pulse-type controller for the material feed system. In the operation of this novel controller, as usual the feed rate or input mass flow is automatically maintained nominally equal to the output mass flow. Means are provided for sensing the amount of material, for example, the mass flow in the reservoir loop. However, when the sensing device signals that the supply of material in the recirculating reservoir loop is low, the controller first initiates a fast, substantial increase in the speed of the feed system and then forthwith reverses its action to decrease said speed to the previous value. This procedure has the effect of adding a predetermined amount of material to the reservoir loop without altering the balance between the input flow and the output flow. The opposite action is taken when the sensing device signals an oversupply of material in the reservoir loop; and this has the effect of removing a predetermined amount of material therefrom.

In the preferred embodiment of the invention, a refinement is made to this basic procedure in view of the fact that an incorrect amount of material in the reservoir loop is frequently the result of an unbalance between the product output flow and the material input flow. In accordance with this refinement, at the end of a pulse-change in the feed rate, the adjustment thereof is not returned all the way to the original setting; that is, a small, incremental portion of the large, fast corrective adjustment is allowed to remain in effect, thereby producing a small change in the ratio of the input mass flow to the output mass flow. Thus if the ratio is substantially out of balance, a series of such corrective adjustments will occur, rather rapidly at first, but decreasing in frequency as the proper balanced condition is approached. Thereafter, only occasional, single-pulse corrections ordinarily occur.

Accordingly, it is a primary object of the present invention to provide an improved feed control system for industrial processes of the type described.

It is another object of the present invention to provide a feed control system in which objectionable oscillatory modes of controller operation are minimized, and whereby at the same time a deviation from the proper mass flow in the reservoir loop is corrected much more rapidly than with previous devices.

It is also an object of the present invention to provide a control system which minimizes the amount of product manufactured with excess variance as a result of depletion of material in the reservoir loop.

It is still another object of the present invention to provide a control system which substantially reduces process downtime by eliminating choking of machine elements.

It is yet another object of the present invention to provide a control system which is easier to adjust and maintain in operating condition than previous systems.

It is an additional object of the present invention to provide such a control system which is readily adaptable to existing industrial processes.

These and other objects and advantages will become more apparent from the following detailed description of certain preferred embodiments of the invention taken in conjunction with the drawings, in which:

FIG. 4 is a schematic circuit diagram, partly diagrammatic, showing details of a preferred type of controller used in the process of FIG. 3;

FIG. 5 is a schematic circuit diagram of an error responsive timer useful in the controller of FIG. 4;

Figure 1:
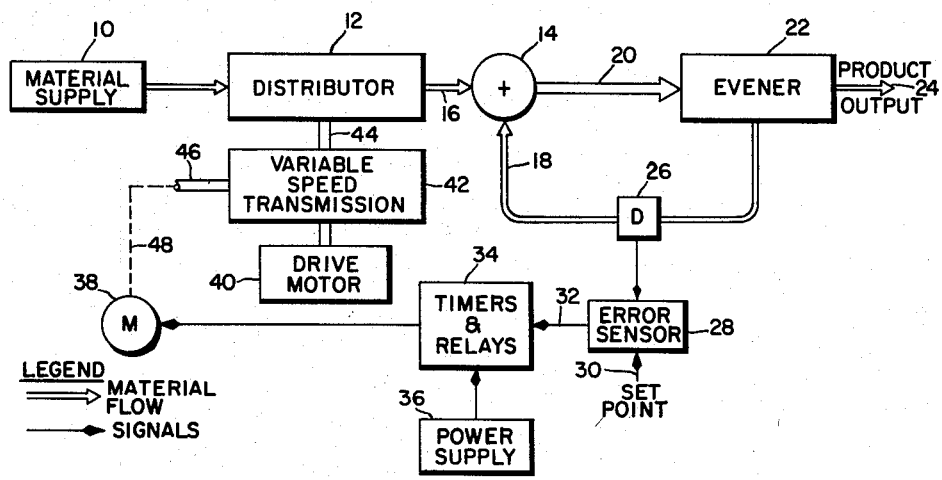
FIG. 1 is a general diagrammatic showing of an industrial process employing the reservoir loop system and controlled in accordance with the present invention.

Referring to the drawings and specifically to FIG. 1, a material supply source 10 feeds a distributor 12. The distributor 12 supplies the material input flow 16 to a combining device 14. Herein material flowing in a return path 18 is combined with the input flow 16 to form an aggregate flow 20 which is delivered to an evener or trimmer unit 22 which levels off the short term irregularities in the aggregate flow 20 to form a smooth, uniform product output flow 24. The surplus material trimmed from flow 20 is diverted into path 18. The return flow of material in path 18, together with the excess material in the aggregate flow 20 constitutes a reservoir loop which absorbs short term variations in the material input mass flow 16 that would otherwise be reflected in the product output 24. It is apparent, however, that on the average, the input mass flow 16 is substantially equal to the mass flow of the product output 24.

In accordance with the present invention, an optimum quantity of material is maintained in the reservoir loop by sensing the return feed mass flow 18 and momentarily pulsing the feed rate of the distributor 12. A device 26 is provided for measuring the mass of the material flowing in the return path 18. The mass flow signal output of the device 26 is transmitted to an error sensor 28 where it is compared with another signal proportional to a desired mass flow set in at 30. An error signal is provided on line 32 which energizes timer and relay circuitry shown generally at 34. The timers and relays 34 connect a power supply 36 to a reversible control actuator motor 38 in a predetermined manner. The movement of material on path 16 is actuated by a constant speed drive motor 40 connected to the distributor 12 via a variable speed transmission 42. The speed of the output shaft 44, which determines the feed rate of distributor 12, is a function of the angular position of a control shaft 46. The control shaft 46 of the variable speed transmission 42 is mechanically connected as indicated by the dotted line 48 to the control actuator motor 38.

Figure 2:
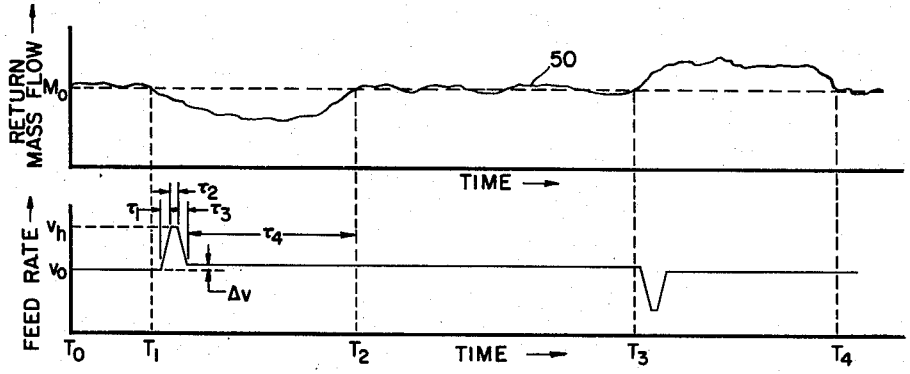
FIG. 2 is a pair of graphs, showing return feed mass flow and feed rate of the process of FIG. 1, arranged in time-wise coincidence.

Referring to FIG. 2, the operation of the apparatus of FIG. 1 proceeds as follows: At time $T_1$, assume that the mass flow 18 of the return feed represented by the curve 50 drops below a desired value $M_0$. The control actuator motor 38 rotates control shaft 46 for a time period $\tau_1$ in a direction to increase the rate of feed of the distributor 12. During time period $\tau_1$ the feed rate increases from a value $v_0$ to a value $v_h$. The control shaft 46 is stopped for a time period $\tau_2$ to maintain the feed rate at the increased value. Whereupon, the control shaft is counter-rotated for a time period $\tau_3$ of slightly lesser duration than time period $\tau_1$. The feed rate drops to a velocity greater than $v_0$ by an amount $\Delta v$. After a time period $\tau_4$, the pulse of material reaches the return feed 18 at time $T_2$ to replenish the circulating reservoir. If, at a later time $T_3$, an excessive amount of material circulates in the return path, a pulse is made in the feed rate in the opposite direction, the effect being noticed at time $T_4$ in accordance with the feed transport lag of the process.

Figure 3:
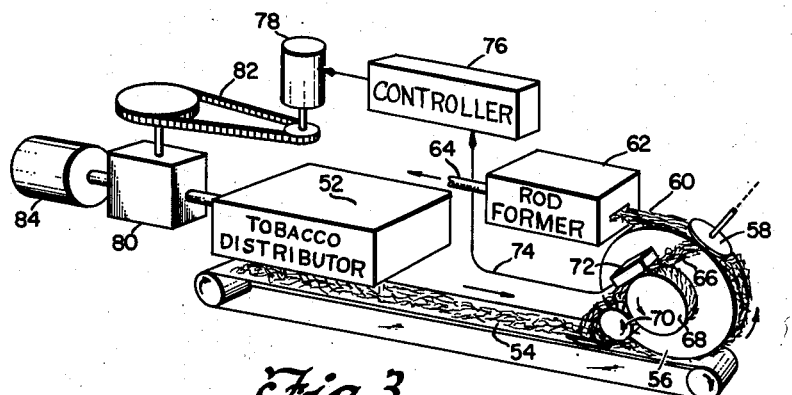
FIG. 3 is a perspective view, partly diagrammatic, of a cigarette-making process having a feed control system in accordance with the present invention.

Referring to FIG. 3, an example of a process utilizing the reservoir loop system is a cigarette making machine such as the "Garant" Twin Rod Spiral Machine which is manufactured by Hauni Werke Korber & Company, K.G., Hamburg, Germany. A conventional feed mechanism or distributor 52 showers cut tobacco onto a horizontal belt 54 passing beneath a drum 56 having a peripheral groove (not shown). The tobacco is pressed into the groove and held therein by a partial vacuum. The tobacco is carried over the drum and under a rotating equalizer knife 58. The leveled tobacco stream 60 is then carried into a rod forming unit 62 where paper is wrapped around the stream and sealed to form a cigarette rod 64. The vertical position of the equalizer knife is usually controlled by means not shown to provide a predetermined mass flow of the rod 64.

The excess tobacco 66, including most of the bunches and irregularities in the tobacco stream carried over drum 56 is received by a second carded drum 68 rotating in the same direction as drum 56 but at a different speed. A picker roller 70 coacts with the drum 68 to remove the tobacco 66 and return it onto the traveling belt 54.

The mass flow of the returned tobacco 66 is measured by a transducer 72 mounted adjacent to the revolving drum 68. The transducer 72 is connected by a line 74 to a feed controller 76. Controller 76 is connected to a control actuator motor 78 geared to a variable speed transmission unit 80 by a chain 82. A conventional heavy duty motor 84 drives the tobacco distributor 52 at a speed determined by the transmission 80.

In the past, when the return stream 66 mass flow decreased, the rate of feed was increased and maintained at a certain velocity; however, the amount of tobacco in the return stream 66 soon became excessive and it was necessary to reduce the feed rate of the stream 54. When the return mass flow increased, the rate of feed was reduced. But eventually the tobacco in the return stream 66 was used up in the production of the rod with the reduced new tobacco feed rate. This continual increase-decrease control action is largely eliminated by, in effect, merely adding enough new tobacco to replenish the return stream, thereby restoring the desired return mass flow.

FIG. 4 illustrates details of the preferred controller circuitry 76. In FIG. 4, the legend indicates the manner in which the relays are shown. The symbols used in the drawings designate identically the same elements as are designated by the corresponding symbols appearing at the left in the legend. Functionally the circuit may be divided into bracketed sections indicated by Roman numerals I to X. Section I includes the conventional alternating current supply 86 connected between line 88 and line 90. Sections II and III are error duration timing circuits connected to the transducer 72 which may be a simple microswitch having a feeler arm 96 and respective high and low limit contacts 96a and 96b. The error duration timing circuits are constructed to initiate a corrective adjustment by the control actuator motor 78 only when the feeler arm 96 engages a limit contact for at least a predetermined minimum period of time. Section IV includes the control actuator motor 78 which may be energized by one of the error duration timing circuits II and III to respectively increase or decrease the feed rate during time period $\tau_1$.

The operation of control actuator motor 78 is controlled by timing sections to vary the feed rate in the manner graphically shown in FIG. 2. Section V is a relay circuit for initiating the timing sequence $\tau_1$–$\tau_4$ whenever an error duration timer II or III times out. Time period $\tau_1$ is controlled by a timing Section VI. Dwell time period $\tau_2$ is controlled by a timing section VII, and time period $\tau_3$ is controlled by a timing section VIII. An off-time relay circuit is shown in Section IX which is energized during time period $\tau_4$ under control of a timing circuit shown in Section X.

The timers described hereinafter in the more detailed operation of controller 76 may be classified into two types: The first type is a typical clock timer such as that manufactured by Eagle Signal Company, Moline, Illinois, under the trademark "Cycle-Flex." Briefly, the operation of this timer is as follows: A synchronous motor is adapted to drive a time pointer across a clock dial by means of a solenoid-operated clutch. At any time, the timer is either reset, timing or timed out. When the timer is in the reset condition the clutch solenoid is deenergized and the time pointer is resting against a reset stop. To start timing, the clutch solenoid is energized. Auxiliary contacts actuated by the clutch solenoid operate immediately to energize the synchronous motor, and the clutch is engaged. The synchronous motor drives the time pointer away from the reset stop. After a predetermined angular rotation of the pointer, a trip pin actuates a snap-action switch which stops the motor. The timer remains timed out until the clutch solenoid is deenergized, whereupon the clutch disengages and a reset spring returns the time pointer to the reset stop.

The second type of timer is an electronic timer having circuits as shown in the dotted outline 100 of Section II. In the operation of timer 100, a capacitor 102 is charged by current flowing from the control grid 104 to the cathode 106 of a thyratron tube 110 and through a diode 108 connected to line 88. When the cathode 106 is connected to line 90 by means of the microswitch 72, the capacitor 102 discharges through a rheostat 112. After a time determined by the setting of rheostat 112, the negative potential on the grid 104 decays sufficiently to permit conduction of the thyratron 110. The plate relay 92 is energized and held by contacts 92a in the cathode circuit which keep thyratron 110 conducting. Relay 92 is hereinafter termed an "increase" relay since it is energized to initiate an increase in the feed rate of the distributor 12, FIG. 1, and similarly relay 114 in Section III is termed a "decrease" relay since it is energized to initiate a decrease in the feed rate.

In the description that follows, different contacts of the same relay are distinguished by a different lower case letter suffixed to the reference numeral of the relay coil. It is observed that the functional circuit notation of the relays used to facilitate the explanation of the controller 76 in FIG. 4 is related to the schematic notation as shown in the accompanying legend. The basic timing circuit 100 is duplicated several times in the controller 76; however, for purposes of simplification the circuit appears hereinafter in block diagram form at 116, 124, and 134.

The construction of controller 76 is best explained in pursuing a more detailed discussion of the sequence of operation of the various components. Accordingly, in the feeler arm 96 engages the low limit contact 96b for a period of time longer than the delay time of the capacitor-resistor network 102, 112, the increase relay 92 is energized and held by its contact 92a which keeps the thyratron 110 conducting. Another contact 92b opens to prevent operation of a decrease relay 114 and associated error duration timer 116 which would interfere with the initiated correction. A reciprocal interlocking function is provided by contacts 114a in the cathode lead of thyratron 110. A timer initiate relay 118 is energized by closure of contacts 92c. Contacts 118a close to energize the clutch solenoid of a clock timer 120 and contacts 118b start the timer motor. The feeler arm 96 is disconnected by contacts 118c. Contacts 120a close to hold the timer clutch solenoid energized. Contacts 120b also close at the start of the cycle to energize a motor control relay 122. Closure of contacts 122a in series with contacts 92d causes the control actuator motor to rotate in one direction.

At the end of the first timing period $\tau_1$, contacts 120c open to stop the timer motor and drop out relay 122. Control actuator motor 78 stops when contacts 122a reopen. Timer contacts 120d close at the end of the timing period $\tau_1$ to initiate the thyratron timing circuit 124. Relay 126 is energized at the end of the dwell time period $\tau_2$ set into the timing circuit 124.

Now, contacts 126a close to reverse the direction of rotation of the control actuator motor 78. Contacts 126b pull in the clutch of a clock timer 130. Contacts 130a close at the start of the timing cycle to energize the timer motor, starting the third timing period $\tau_3$. At the end of $\tau_3$, contacts 130b close to energize an off-time relay 132 which is then held by its contacts 132a. Contacts 132b open, and relays 92, 118, are deenergized, timers 120 and 124 are reset, and the control actuator motor 78 stops due to reopening of contacts 92d. Initiation of the error duration timers 100 and 116 is prevented by disconnecting the feeler arm 96 with contacts 132c.

Closure of contacts 132d starts a fourth thyratron timer 134 timing $\tau_4$. At the end of the fourth timing period, corresponding in duration to the transport lag $\tau_4$, a relay 136 is energized by the timer 134. Contacts 136a then opens in order to reset timer 130 and drop out the off-time relay 132. Whereupon, contacts 132d reopen to drop relay 136. Contacts 136a re-close and the initial circuit conditions are established whereby the controller 76 is ready to make further corrective adjustments if needed.

Briefly, the operation of the controller 76 in response to an overabundance of returned tobacco 66 proceeds as follows: Decrease relay 114 picks up and is held by contacts 114b. However, now when relays 122 and 126 are energized, contacts 122b and 126c are successively connected in series with contacts 114c to operate the control actuator motor 78 in completely reverse fashion. Contacts 114d serve to energize relay 118. The remaining relays and timers operate exactly as before. It is important to properly couple the control actuator motor 78 with respect to the control shaft of the variable speed transmission unit 80 so that the feed rate is adjusted in the correct direction to bring the return feed "on target."

If the height of the pulse corresponds to an increase in mass flow of M grams per second the total mass of tobacco transferred to the return stream 66 is $$m_T \cong M\frac{(\tau_1+\tau_3)}{2}+M\tau_2$$

The duration of the pulse, $\tau_1+\tau_2+\tau_3$, in feed rate is best found by experiment. Applicant has successfully controlled the process of FIG. 3 with a pulse of six seconds total duration. It should herein be apparent that the manner in which the feed rate changes with respect to time may be different for different processes. It may be desired to change the feed rate in a non-linear manner. The intermediate timing interval $\tau_2$ may be made extremely short or of adjustable duration as hereinafter described.

Referring now to FIG. 5, the timing circuit at 124 may be modified to adjust the duration of $\tau_2$ in accordance with the deviation of the return mass flow from the desired value $M_0$. A comparison bridge network 140 comprises a pair of parallel-connected potentiometers 142 and 144 connected across the secondary winding 146a of a transformer 146. The primary winding 146b may be connected across the A.C. source 86. A feeler arm 148 pivotally mounted at 150 rides on the return tobacco stream 66 carried by the drum 68. The feeler arm 148 is mechanically linked to an adjustable tap 142a of the potentiometer 142 so that the position of the tap is a function of the amount of tobacco in the stream 66. The taps 144a and 142a of potentiometers 144 and 142 are connected to a full wave rectifier bridge 152. The A.C. potential existing between the potentiometer taps 142a and 144a is proportional to the error deviation in return mass flow. This error potential is rectified to charge a capacitor 154.

At the end of the initial timing period $\tau_1$, a negative potential proportional to error has accumulated on capacitor 154. Timer 120 disconnects the capacitor from the comparator bridge and rectifier via contacts 120e. Contacts 120f apply the negative potential of capacitor 154 to the control grid of a thyratron 156. Thyratron 156 will remain non-conducting until enough charge on capacitor 154 has leaked off through a rheostat 158 to establish the firing potential of thyratron 156. Contacts 120e and 120f respectively close and reopen when the timer 120 is reset as hereinabove described.

Figure 6:
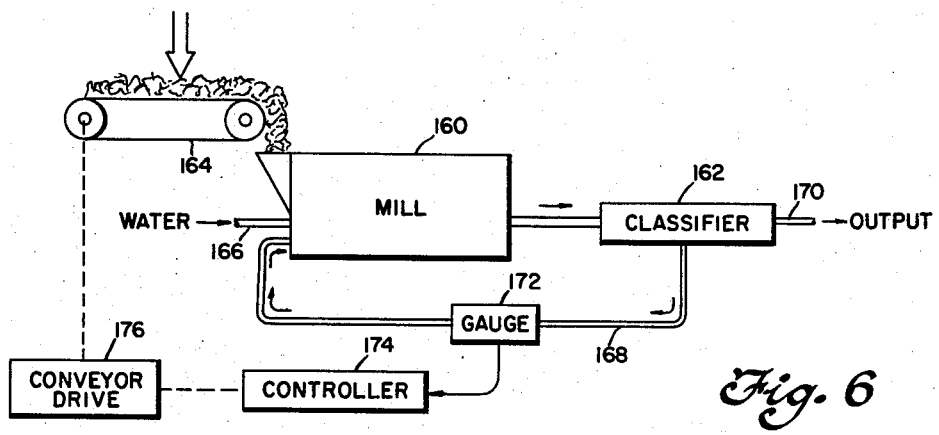
FIG. 6 is a diagrammatic view of an ore-grinding process controlled by the present invention.
Figure 7:
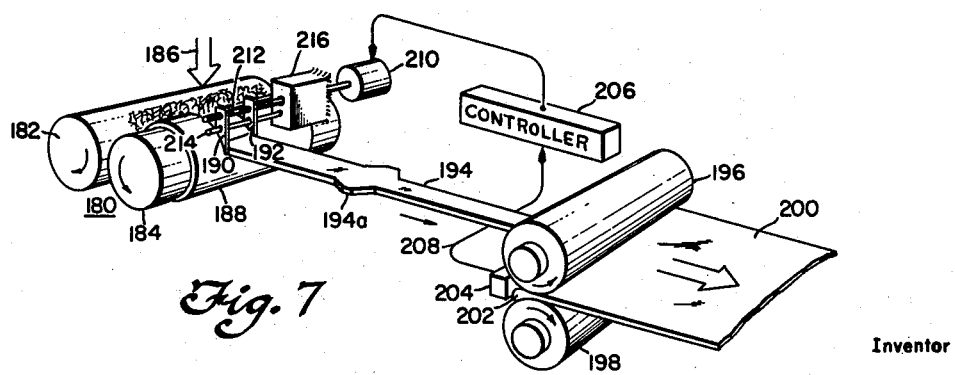
FIG. 7 is a perspective view, partly diagrammatic, of a calendering process controlled in accordance with the present invention; and, FIG. 8 is an enlarged side elevation of a portion of the process of FIG. 7.

To illustrate other industrial processes which may be advantageously controlled by the present invention, reference is made to FIGS. 6 and 7. In FIG. 6, a closed circuit ore-grinding process comprises a mill 160 and a classifier 162. A conveyor 164 transports ore to be ground into the mill 160. Water is supplied through a conduit 166 as a grinding aid. Oversize material from the classifier 162 is returned over a conduit 168 to the input of the mill for regrinding. In the ball mill grinding circuit, it is important to note that the circulating load in conduit 168 may be 200 to 400 percent larger than the raw ore feed. When a ball mill is in closed circuit with any type of classifier, the quantity of the circulating load is the best indication of mill underload or overload. Since the quantity of usable discharge at outlet 170 is usually fixed by other control systems and maintained substantially equal to the raw ore feed, difficulties also obtain in this process when the feed rate is adjusted to increase the desirable throughput without choking the mill.

According to the present invention, a density gauge 172 is mounted in the conduit 168 to transmit mass flow signals to a controller 174. The controller 174 adjusts the conveyor drive 176 in the manner described in reference to FIG. 3 to maintain a circulating load of the desired value.

A typical calendering process is shown in FIG. 7, wherein the feed system comprises a Banbury mill 180 including a pair of coacting rolls 182, 184 for masticating comminuted plastic and adhesive substances introduced at 186. A blanket 188 forms on the roll 184. A pair of adjustable knives 190, 192 cut a continuous slab 194 from the central portion of the blanket 188. The slab 194 enters the nip of calender rolls 196 and 198 and issues in the form of a wide sheet 200 of considerably reduced thickness. A pencil bank 202 forms at the nip of the rolls 196, 198. The pencil bank 202 is functionally analogous to the reservoirs and return feed loops described in the foregoing embodiments of the present invention. Should the rate of feed of the slab 194 decrease, material from the pencil bank 202 provides the deficiency. Frequently, an increase in the rate of feed creates a pencil bank large enough to spring the calender rolls apart thereby producing a sheet 200 of increased thickness and altered profile shape across the width thereof. An inadequate pencil bank has the reverse effect and may result in a totally defective sheet 200.

The present invention provides a detector 204 mounted adjacent the pencil bank 202 to determine the size thereof. The detector is coupled to a controller 206 over line 208. Controller 206 operates control actuator motor 210. Motor 210 drives a lead screw 212 having oppositely threaded end portions engaging the knives 190 and 192. The knives are stabilized by a guide rod 214 secured to a stationary end housing 216.

In a response to a decrease in the pencil bank 202, the controller operates the motor 210 in the manner described hereinabove. The knives are moved apart, maintained, and then moved together to provide the increase in mass flow represented by the widened slab portion 194a. Conversely, in response to an excessive pencil bank, a narrowed portion is provided in the slab 194.

Figure 8:
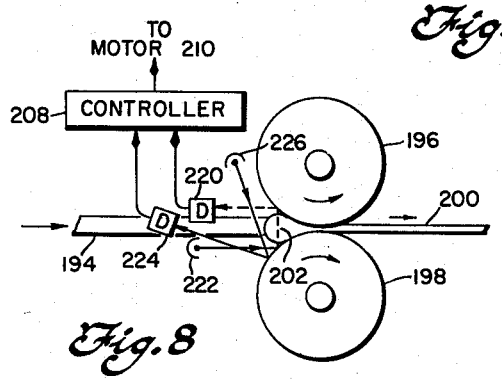

A preferred pencil bank detector is shown in FIG. 8, wherein the low limit detector may be a photocell 220 mounted to receive light energy reflected from both the rolls 196, 198 by a light source 222. A high limit detector may be another photocell 224 adapted to receive energy reflected from the lower roll by a light source 226. The two paths of light transmission are indicated in principal ray diagram form. Controller 206 is operated only when the pencil bank 202 blocks light from the photocell 224 or allows light to impinge upon the photocell 220. The circuitry required for this modification will be apparent to those skilled in the art.

While the invention is herein shown and described as embodied in specific systems and particular apparatus, it will be understood that such showing and description is given by way of example only, and that many other different rearrangements as well as apparatus modifications can be made without departing from the spirit and scope of the invention as set forth in the appended claims.

What is claimed is:

1. In a continuous processing apparatus having a material input flow, adjusting means therefor, a product output flow and a reservoir section interconnecting said input and output flows, a pulse-type feed controller comprising means responsive to a deviation in the quantity of material in said reservoir section for producing a substantial corrective change in the prevailing setting of said input flow adjusting means, and means independent of said deviation responsive means for subsequently reversing said change so as to substantially restore said prevailing setting.

2. A controller as in claim 1, wherein the extent of said reversal is less than the extent of said corrective change, whereby a small increment of said change is added to said prevailing setting.

3. A controller as in claim 1, which includes means for providing a time delay between the completion of said corrective change and the initiation of said reversal thereof.

4. In a continuous processing apparatus having a material input flow, adjusting means therefor, a product output flow and a reservoir section interconnecting said input and output flows, a pulse-type feed controller comprising reversible motor means for driving said adjusting means; a cyclically operating switching device for providing a switching sequence wherein firstly power is applied to said motor in one direction for a first time interval, secondly power is removed from said motor for a second time interval, thirdly power is applied to said motor in the opposite direction for a third time interval, and fourthly power is removed from said motor and said switching sequence is automatically terminated; means responsive to a deviation in the quantity of material in said reservoir section for initiating said cyclical sequence of said switching device, and means responsive to the direction of said deviation for controlling the respective directions in which power is applied to said motor during said first and third time intervals.

5. A controller as in claim 4 wherein said first and third time intervals are of fixed duration, and wherein said switching device includes manually adjustable means for selecting the length of said last-mentioned intervals independently.

6. A controller as in claim 4 wherein said second time interval is of fixed duraiton, and wherein said switching device includes manually adjustable means for selecting the length of said second time interval.

7. A controller as in claim 4 which includes automatic means responsive to the amount of said deviation in the quantity of material in said reservoir for proportionally varying the length of said second time interval.

8. In a continuous processing apparatus having a material input flow, adjusting means therefor, a product output flow and a reservoir section interconnecting said input and output flows, a pulse-type feed controller comprising means responsive to a deviation in the quantity of material in said reservoir section for producing a substantial corrective change in the prevailing setting of said input flow adjusting means, means for subsequently reversing said change so as substantially to restore said prevailing setting, and means also responsive to said deviation for providing a time delay between the completion of said corrective change and the initiation of said reversal thereof, said time delay being automatically variable in accordance with the extent of said deviation.

References Cited in the file of this patent

UNITED STATES PATENTS

| | | |
|---|---|---|
| 2,519,089 | Whitaker | Aug. 15, 1950 |
| 2,704,079 | Molins et al. | Mar. 15, 1955 |
| 2,729,213 | Broekhuysen et al. | Jan. 3, 1956 |
| 2,745,411 | Gilman et al. | May 15, 1956 |